United States Patent Office 3,454,111
Patented July 8, 1969

3,454,111
APPARATUS FOR TIGHTENING THREADED PARTS
Peter Niess, Bopfingen, Wurttemberg, Germany, assignor to Gardner-Denver Company, Quincy, Ill., a corporation of Delaware
Filed Apr. 20, 1967, Ser. No. 632,414
Claims priority, application Germany, Apr. 23, 1966, G 46,669
Int. Cl. E21c *5/02;* B23q *5/26;* B25b *17/00*
U.S. Cl. 173—12                                    38 Claims

ABSTRACT OF THE DISCLOSURE

An apparatus for tightening, with predetermined tension, screw nuts or similar threaded parts with at least one driven spindle carrying a key means for the threaded part, comprising a housing, and a spindle rotatably mounted in the housing. Means are provided for rotating the spindle to obtain an initial tightening. Another means rotates the spindle for a predetermined angle, and stop means are then operatively connected to the spindle which are effective upon reaching the predetermined angle for stopping the rotation of the spindle at the predetermined angle.

---

Figure 1:
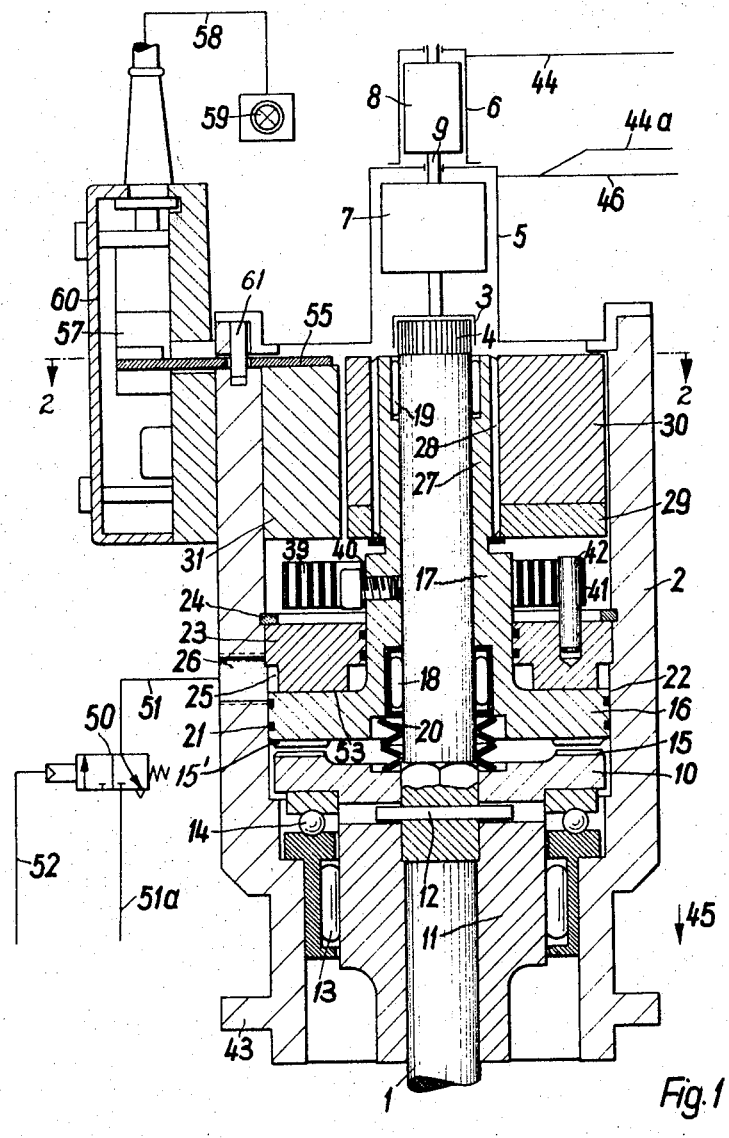

The present invention relates to an apparatus for tightening, with predetermined tension, screws, nuts, or similar threaded parts, having at least one spindle capable of being driven and carrying a screw or the like for the threaded part, which spindle is capable of being rotated about a predetermined angle after turning the screw or the like up to a tight position on a clamped abutment face adjoined thereto.

It is known to tighten threaded parts such as screws or the like with a predetermined torque introduced into the threaded part in order thereby to fix the tension produced by elongation of a threaded bolt or the like. It has already been shown that with this method considerable tolerance differences can occur which thereby result in the fact that the individual threaded parts offer different resistances in opposition to a tightening torque, particularly frictional resistances.

These frictional resistances are, for example, essentially higher in dry threaded parts than in threaded parts which are contaminated, for example, by oil, grease or the like, thereby resulting in scattering differences up to 50% in the initial stress of similar worked metal pieces. Also, by the torsion occurring by turning a screw, the torque introduced is partly interrupted.

It has therefore already been attempted, in order to determine the elongation of a threaded bolt or the like and with it its tension, to turn the threaded part about a predetermined angle after turning it to a tight position on a clamped surface adjoined thereto. With this method very close tolerances can be attained without influence of the frictional resistance or the like occurring by means of the threaded part. The practical use of this method, however, fails in the apparatus developed for it, which operates by means of a rack mechanism. Such apparatus are very expensive and complicated to control. In particular, however, the use of this known mechanism is not suited for multiple screw spindles which are commonly used in series manufacture today.

It is one object of the present invention to provide an apparatus for tightening threaded parts, wherein the tightening of the threaded parts with predetermined tension can be undertaken accurately. In particular, it is an object of the present invention to provide such an apparatus, for example, effective under cramped space conditions where several similar apparatus are arranged tightly side by side and rigidly connected with one another. The apparatus according to the present invention permits an automatically running reproducible work course. Furthermore, the angle about which the threaded part is turned after reaching its position is accurately adjustable. The apparatus is suitable both for turning the threaded part up to a tight position and also for tighter screwing after reaching this position. The attainment of the predetermined fixed tightened state of the screw can be indicated in a simple manner. The apparatus is simple in construction and inexpensive in production.

It is another object of the present invention to provide an apparatus for tightening, with predetermined tension, screws, nuts or similar threaded parts with at least one driven screw spindle carrying a screw driver or the like for the threaded part which is capable of being rotated about a predetermined angle after turning the screw or the like up to a tight position on a clamped surface adjoined thereto, which comprises a stop working on the screw spindle upon reaching the predetermined angle. By this stop, the screw spindle can be accurately brought to a stop in a simple way at the instant at which the predetermined tension of the threaded part is attained.

A particularly advantageous embodiment of the invention comprises the stop formed as a swivel stop connected with the spindle which is adjoined to a suitably stronger opposing stop. The swivel stop can be arranged in a most compact space so that the apparatus has small dimensions and can be arranged with additional similar apparatus in compact space side by side.

If the swivel stop and the opposing stop are formed as collision abutments with abutment faces disposed crosswise to the direction of movement of the stop, preferably in diametric planes, then the end position of the swivel stop and therewith the tension of the threaded part to be tightened are accurately determined.

It is still another object of the present invention to provide an apparatus wherein an additional recoil stop, connecting the initial position of the screw spindle or, respectively, of the stop fixedly with this screw spindle, or, respectively, this stop, is provided to which is adjoined a correspondingly stronger opposing stop. Thereby the screw spindle or, respectively, the stop, as the case may be, can be moved back again accurately to the predetermined angle. Appropriately, the recoil stop relative to the initial position stands below the strength of the recoil spring or the like which has a particularly small space requirement when it is formed in the shape, for example, of a spiral spring in the axial direction, preferably, directly in front of the stops.

In order to be able to change the angle about which the stops can swivel between both of their end positions, the swivel stop opposite the recoil stop is adjustable. Suitably, in this case both stops are capable of being rotated and fixed preferably with a removable inner gearing on which is fastened a corresponding outer gear part.

The movement of the stops can be made sufficiently accurate in spite of rugged construction methods, if the swivel stop and/or the recoil stop are also provided with stop surfaces on their back sides and if both stop surfaces of the swivel stop or, respectively, the recoil stop lie distinctly asymmetrical to the inner gearing. In addition to this, it was found that the stop surfaces at times cover, for example, about one quarter of the gear tooth distribution of the inner gearing, so by turning both stops, they can be adjusted up to an accuracy corresponding to a quarter of the gear tooth distribution.

Both stops can be arranged in very little space if they are placed one behind the other in the axial direction of the screw spindle. Advantageously, the swivel stop is dimensioned larger than the recoil stop which, for example, can be reached by an axial extension of the swivel stop. In order to keep the load of the apparatus as small as possible while the stops strike one after another, at least one stop or opposing stop, respectively, is provided with a damping element in the form, for example, of an elastic insertion or the like.

A further simplification in constructing the apparatus according to the present invention results if the fixed, opposing stop has a stop surface both for the swivel stop also for the recoil stop.

In a further improvement of the present invention, the stops are arranged in a preferably hollow cylindrical housing of the apparatus, on the inner side of which is attached the fixed opposing stop, extending over the entire axial length of both stops. The stops can thereby be dimensioned readily, so that the apparatus housing appears not larger than the hitherto known apparatus.

It is yet another object of the present invention to provide an apparatus wherein the stops are operably connected by means of a disengaging movable couple on the screw spindle. Consequently, the screw spindle can be turned independently of the stops with the coupling disengaged, so that one and the same apparatus is suitable both for turning the threaded part up to a tight position on the clamped surface joined thereto, and also for subsequent tighter screwing until a predetermined tension is achieved. For this the threaded part is initially turned with the coupling disengaged on the screw spindle, up to a tight position, after which the coupling is engaged and the screw spindle is turned in continuation of its rotary operation until the swivel stop now coupled thereto becomes contiguous to the opposing stop. After reaching this position, the coupling is again disengaged, and the swivel stop is retured by a recoil spring operatively connected thereto to its initial position determined by the recoil stop.

The disengaging coupling can be arranged in a very small space if it has axially movable coupling members. Appropriately the coupling members lie in the axial direction in front of the stops, preferably behind the recoil spring.

The coupling members can be formed advantageously, preferably, as coupling discs with face gears, which face gears are suitably formed by a saw gearing of preferably 120 teeth with the forward teeth surfaces lying nearly in axial planes. The distribution of the face gear into 120 teeth guarantees, in most applications of the apparatus, a satisfactory accuracy with which the coupling engages. With the face teeth lying in axial planes, all axial forces operating on the coupling members are eliminated. It is, however, also conceivable to use, instead of this positive-type coupling, a friction coupling, for example, a clamping piece fixed under clamping connection.

Advantageously one coupling disc, lying preferably away from the stop coaxially to the spindle, is fastened to the screw spindle, for example, with a diametric pin through a projecting portion of the disc spanning the screw spindle, while the other coupling disc is disposed coaxially and rotatably free relative the screw spindle and has an outer gear portion operatively connected to the stops by a cooperating inner gearing on the latter. The latter coupling disc can be mounted in a simple manner securely with bearings, such as roller bearings, rotatable on the screw spindle and axially slidable.

A further simplification in the construction of the apparatus according to the present invention is attained when the coupling discs are uncoupled under the force of disengaging springs, such as plate springs, which are preferably disposed between the facing sides of the discs about the screw spindle so that for control of the coupling simply a control impulse is necessary.

For operation of the coupling, the movable coupling disc or member is connected, in a further development of the present invention, as a piston driven in a cylinder communicating, preferably on the side of the piston away from the disengaging spring, with a pressure conduit for a pressure fluid. The result is a particularly compact, minimum space as well as a simple and light structure, if the piston is formed by the axially movable coupling disc and the cylinder is formed by the apparatus housing.

According to an additional feature of the present invention, the cylinder space removed away from the disengaging members for the piston is closed on the front side by a cylinder cover arranged in the housing and surrounding the projecting portion of the coupling disc whereby the cylinder cover has appropriately at least one stop formed preferably through its front side for the disengaged position of the axially movable coupling disc so that this is fixed precisely.

The cylinder cover can, in a simple manner, serve for the fastening of one end of the recoil spring, if this is disposed on one end of the projecting portion of the coupling disc and with the other end on the cylinder cover, preferably on an axial pin fastened eccentrically thereto. Suitably also the disengaging coupling and the recoil spring are disposed within the apparatus housing.

The attainment of the end position of the swivel stop can be indicated or, respectively, controlled in a simple manner if a contact is provided which is operated by a stop connected with the screw spindle upon reaching the predetermined angle, which closes the switch of an indicator, such as, for example, a control lamp. Advantageously the contact is combined with a lever disposed in the swivel region of the swivel stop lying in the apparatus housing which is substantially covered, in the axial direction, with the fixed stop and preferably lies in the region of its one front side.

According to a further object of the present invention, the screw spindle is combined with a motor drive having at least two load increments for the pre-screwing and the tight screwing, which are inserted one after another. The turning of the threaded part takes place with the lower load increment, and consequently with less torque. In turning the threaded part up to a tight position, limited for example by different frictional resistances, tolerance differences could be adjusted for example to yet approximately plus or minus 10%, whereby these tolerance differences are essentially lower than the tolerance difference which occur in tighter screwing according to previously known methods by the use of a predetermined torque. The tolerance differences, occurring during pre-screwing under the use of the first load increment, of, as indicated, about plus or minus 10% maximum, referring to the tension which the screw has after reaching the tight position, do not further increase the absolute value after tighter screwing of the threaded part. That is, after turning the same about the predetermined angle, so that the percentage tolerance difference amounts to, for example, in the case of tighter screwing tension which is five times higher than the pre-screwing tension, only ⅕; that is, in the case of plus or minus 10%, only plus or minus 2%.

A very reliable working embodiment of the present invention is achieved if the motor drive includes a separate motor for each load increment. Suitably, such motors are arranged axially one behind the other, preferably coaxially to the screw spindle, whereby a structure is provided particularly having minimum dimensions.

For the motor drive of the screw spindle, compressed air motors or hydraulic motors have proved especially good.

According to another feature of the invention, two compressed air motors are coupled with one another and with the screw spindle whereby one compressed air motor has a smaller torque providing for the screwing of the threaded part up to an initial tight position on the adjacent clamped surface and the other motor has a larger torque providing for the tighter screwing of the threaded part. In the initial or pre-turning of the threaded part, the driving of the screw spindle takes place exclusively by means of the smaller compressed air motor with its smaller torque, whereby the larger compressed air motor operates empty, that is, without compressed air actuation. After reaching the tight position of the threaded part during engagement, the coupling which connects the stops with the screw spindle is switched over to the larger compressed air motor, so that the threaded part is further turned completely through the angle necessary for attaining the predetermined tension up to the position of the stop. The reversing gear from one load increment to another load increment can, in a simple way, be controlled by means of, for example, a time relay, or pressure controlled by means of a pressure switch. Instead of carrying out both load increments by two separate motors, it is also possible to use only one motor and to let this run during the first load increment, for example, by actuation with a reduced compressed air pressure and a resulting smaller torque than during the second load increment.

In order to permit the switching from the first load increment to the second load increment and the simultaneous engaging of the coupling after reaching the tight position of the threaded part, a regulator is provided which is connected with a valve inserted into the pressure piping running to the cylinder, which opens upon reaching the tight position of the threaded part.

As motor power for an apparatus according to the present invention, in addition to pressure motors, also electric motors or the like are suitable.

Figure 2:
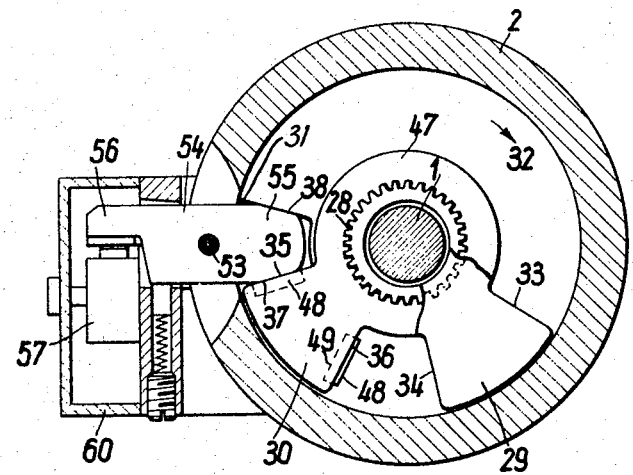

With these and other objects in view, which will become apparent in the following detailed description, the present invention will be clearly understood in connection with the accompanying drawings, in which:

FIGURE 1 is an axial section of an apparatus according to the present invention in a partially simplified representation; and FIG. 2 is a section along the lines 2—2 of FIG. 1.

Referring now to the drawings, and in particular to FIGS. 1 and 2, the apparatus, according to the present invention, comprises a screw spindle 1 mounted in a housing 2 and connected at its rear end 4 by a coupling joint 3 with a compressed air motor 5, the latter being removably flanged onto the housing 2. A smaller compressed air motor 6 is removably bridged on the compressed air motor 5 in an axial extension of the screw spindle 1, and has a rotor 8 which by means of an axle 9 is connected rigidly with the rotor 7 of the compressed air motor 5.

A coupling disc 10 having a forward extending projecting portion 11 is fastened on the screw spindle 1 within the housing 2, which has an inner hexagon or a profile with a plurality of teeth, whereby the axial fastening is produced by a diametric borehole in which a pin 12 passes through the screw spindle 1. The projecting portion 11 is mounted with a radial bearing 13 and an axial bearing 14 in the housing 2.

The coupling disc 10 has a face gear 15 directed rearwardly which faces a corresponding face gear 15 on a coupling disc 16 mounted rotatably and axially movably on the screw spindle 1. The coupling disc 16 has a projecting portion 17 directed rearwardly which is rotatably mounted over radial bearings 18 and 19 on the screw spindle 1.

Plate springs 20 are arranged on the screw spindle 1 between the facing sides of the coupling discs 10 and 16, which are clamped in facing counterbores of the coupling discs 10 and 16 and press the discs away from one another. The axially movable coupling disc 16 is formed as a piston with packing provided for on the circumference. The housing 2 is formed, in the region of the piston or coupling disc 16, as a cylinder 22 which is closed on its back with a cylinder cover 23 held by a retaining ring 24. An inlet 26 is provided in the cylinder 22 communicating with the cylinder chamber 25, lying between the piston 16 and the cylinder cover 23, forming a bore hole 26 for the pressure medium.

The rear end 27 of the projecting portion 17 is formed as a casing provided with outer gear teeth 28. On this casing are axially arranged, directly behind one another, two radially projecting stops 29 and 30 with inner gear teeth corresponding to the outer gear teeth 28, to which is adjoined a fixed stop 31 fastened on the inside of the housing 2. The stops 29 and 30 and the fixed stop 31 have, as the case may be, both on their front sides and rear sides, abutment or stop surfaces 33 and 34 or 35 and 36 or 37 and 38, whereby all stop surfaces lie in axially and radially disposed planes.

A spiral spring 39 is disposed between the stops 29, 30 and 31 and the cylinder cover 23 lying coaxial with the screw spindle 1 and fastened with its inner end 40 on the projecting portion 17 of the coupling disc 16 and with its outer end 41, made as a loop, on an eccentric axial pin 42 of the cylinder cover 23. The spiral spring 39 operates in a direction opposite the rotary arrow 32 of the screw spindle 1.

The function of the described apparatus is as follows:

With the front end of the screw spindle 1, by way of example, a screw driver or similar coupling element for a threaded part is arranged by means of a mechanism fastened to a flange 43 of the housing 2. This coupling part is connected by axial movement of the whole screwdriver-shaped apparatus with the threaded part to be tightened. By actuation of the small compressed air bridge motor 6 with compressed air through a conduit 44, the screw spindle 1 is driven rotatably in the direction of the arrow 32, whereby the rotor 7 of the second compressed air motor 5 is driven. With this movement the threaded part to be tightened is screwed up to its tight position on the clamped surface adjoined to it, during which the maximum torque of the compressed air bridge motor 6 is chosen so large, that this is stopped when the threaded part has reached the tight position. Preferably, the condition is selected as the tight position at which the threaded part, as for example a screw bolt, is exposed to an elongation with further turning.

After reaching the tight position by tightening of the screw spindle 1 with the help of the compressed air bridge motor 6, the coupling disc 16, formed as a piston, moves by introduction of a pressure medium into the cylinder chamber 25 against the strength of spring 20 axially in the direction of arrow 45 and is coupled to the fixed coupling disc 10, the latter being permanently coupled with the screw spindle 1. After coupling, the compressed air motor 5 is connected by means of a duct 46 with compressed air, so that now the threaded part is again turned with a larger torque from its condition of tight position. The screw spindle 1, connected by means of the coupling disc 16 and the outer gear teeth 27 of the projection 17 thereof with the engaged coupling, tightly with the stops 29 and 30, can be turned only so far until the swivel stop 30 abuts its front stop surface 35 against the opposite stop surface 37 of the fixed stop 31. Thereby the tension with which the threaded part is screwed is accurately determined.

After tight screwing of the threaded part, the couplings 10 and 16 are uncoupled, so that the stop, under the power of the spiral spring 39, swings back opposite the direction of the arrow 32 to its initial position in which the recoil stop 29 abuts its front stop surface 33 against the opposite stop surface 38 of the fixed stop 31. After turning the next screw up to tight position, the coupling is again engaged and the described operating cycle repeats.

The stop surfaces 35 and 36 of the swivel stop 30 are arranged asymmetrically to the inner gearing of hub 47 carrying the swivel stop 30, so that by removing the swivel stop 30 from the outer gearing 28 and reverse resetting, a fine adjustment of the swivel stop 30 is possible. Correspondingly also, the stop surfaces 33 and 34 of the recoil stop 29 are arranged asymmetrically, however differently asymmetrically from the stop surfaces 35 and 36 of the swivel stop 30, so that a still more accurate adjustment is possible.

As FIG. 2 further shows, the swivel stop 30 in the region of its stop surfaces 35 and 36 has a damping element 48 in the form of inserted elastic plates which are compressed into the cavity 49 when the swivel stop 30 runs into the fixed stop 31, so that in spite of the suppressing damping element 48 an accurate stop is realized.

Instead of driving the screw spindle 1 by means of two separate motors 5 and 6, also only one motor 5 can be used which can be charged by means of two separate conduits 46 and 44a with different flow pressures. In this case, the turning of the threaded part up to a tight position results by actuation of conduit 44a with a smaller pressure. After reaching the tight position, the conduit 46 is switched over to a higher pressure which is adequate for tighter screwing of the threaded part.

The control of the coupling discs 10 and 16 takes place, for example, by means of an air operated valve 50 which communicates by means of a conduit 51 with the inlet 26 of the cylinder chamber 25. The valve 50 is controlled by means of a control conduit 52 by compressed air and during operation, opens the passage to a supply conduit 51a for conduit 51.

The front side 53 of the cylindrical cover 23 facing the coupling disc 16 serves as a stop for the uncoupled position of the coupling disc 16.

As FIGS. 1 and 2 further show, double-armed lever 54 is mounted in the region of the rear and front sides of the fixed stop 31 in the wall of the housing 2 and turns about a pin 61. One arm 55 of the lever 54 lies in the swivel region of swivel stop 30 in such a manner that the arm 55 swivels about the pin 53 during stopping of the stop surface 35 of the swivel stop 30 against the stop surface 37 of the fixed stop 31. In this swivel operation an electrical contact 57 is pressed by the other arm 56 of the lever 54, which contact 57 is affixed to the outside of the housing 2 and closes a circuit 58 of an indicator, such as, for example, a control lamp 59.

The arrangement of the contact 57 which is provided for in the housing 60 can also be made so that the housing 60 and the contact 57 are disposed in the axial direction of the screw spindle 1 within the projection of housing 2.

It can also be advantageous to provide, instead of an electric switch 57, a pneumatic, hydraulic or other switch. Furthermore, a control circuit can be positioned over the switch aside from or, respectively, instead of an optical, acoustical, or similar indicator by which, for example, the next working cycle is controlled or, respectively, stopped.

A particularly economical work means is possible with the apparatus according to the present invention, if the more powerful motor 5 has a torque which provides, with the addition of the torque of the other motor 6, the torque for the tighter screwing of the threaded part. In this case, with the smallest possible output of the motor, the more powerful motor 5 can be switched to the weaker motor 6 after reaching the tight position of the threaded part, so that both motors 5 and 6 can then jointly drive the screw spindle.

Instead of the damping element 48, a suppressor can be provided, lying in front of the position of attachment of the swivel stop 30 to the screw spindle 1, so that the accuracy of the swivel operation of the stop 30 cannot be encroached upon by the suppressor. Such a suppressor can be provided, for example, in the coupling joint 3.

I claim:

1. An apparatus for tightening, with predetermined tension, screws, nuts or similar threaded parts with at least one drive spindle carrying a key means for a threaded part, comprising:
a housing,
a spindle rotatably mounted in said housing,
means for rotating said spindle for a predetermined angle,
stop means for said spindle effective upon reaching said predetermined angle,
said stop means comprises, a first stop operatively connected with said spindle for rotation therewith, and an opposing second stop immovably disposed in the path of said first stop for stopping the rotation of said spindle when said first stop hits said second stop.

2. The apparatus, as set forth in claim 1, wherein:
said first and said second stops are formed as cooperating abutments having abutment faces disposed crosswise to the direction of movement of said first stop in radial diametrical planes.

3. The apparatus, as set forth in claim 1, which includes:
a third recoil stop determining a starting position of both said spindle and said first stop, respectively, and connected with one of the latter,
return means for rotating said spindle toward said starting position, and
an opposing fourth stop immovably disposed in the path of said third recoil stop for stopping the latter in said starting position when said third recoil stop hits said fourth stop.

4. The apparatus, as set forth in claim 3, wherein:
said return means includes a recoil spring operatively connected with and tending to return rotate said spindle and said third recoil stop to said starting position.

5. The apparatus, as set forth in claim 4, wherein said recoil spring comprises a spiral spring disposed axially adjacent to said stops.

6. The apparatus, as set forth in claim 3, wherein:
said first stop is adjustable relative to said third recoil stop.

7. The apparatus, as set forth in claim 6, further comprising:
means selectively operatively connected to and about said spindle and including an outward toothed part, and
both said first stop and said third recoil stop include an inward toothed part each selectively rotatably and adjustably secured to said outward toothed part and releasable therefrom.

8. The apparatus, as set forth in claim 7, wherein;
at least one of said first stop and said third recoil stop has two sides each forming a side abutment face, and
said abutment faces are disposed asymmetrically relative to said inward toothed part.

9. The apparatus, as set forth in claim 3, wherein:
said first stop and said third recoil stop are disposed in axial direction of said spindle in series relative to each other.

10. The apparatus, as set forth in claim 5, wherein:
one of said first stop and said third recoil stop is of a dimension larger than that of said recoil spring and extends axially longer than said recoil spring.

11. The apparatus, as set forth in claim 1, wherein:
said stops have abutment faces for stopping rotation of said first stop,
at least one damping element disposed between the opposed abutment faces of said first stop and said second stop, respectively, and
said damping element being disposed in front of said first stop and comprises elastic inserts positioned in at least one of said abutment faces.

12. The apparatus, as set forth in claim 3, wherein:
said second stop has a first abutment face for said first stop and a second abutment face for said third recoil stop.

13. The apparatus, as set forth in claim 9, wherein:
said stops are disposed within said housing, and
said second stop is fixed on the inside of said housing and extends over the entire axial length of both said first stop and said third recoil stop.

14. The apparatus, as set forth in claim 1, which includes:
a coupling means releasably connecting said first stop with said spindle.

15. The apparatus, as set forth in claim 14, wherein:
said coupling means has axially movable coupling members.

16. The apparatus, as set forth in claim 15, wherein:
said coupling members are disposed in axial relationship in front of said stops.

17. The apparatus, as set forth in claim 15, wherein:
said coupling members comprise spur gear discs.

18. The apparatus, as set forth in claim 17, wherein:
said spur gear discs comprise a screw tooth gearing of 120 teeth with tooth faces disposed in planes perpendicular to the axis of said spindle.

19. The apparatus, as set forth in claim 1, which includes:
a first coupling disc disposed away from but facing said stops coaxially about said spindle,
means securing said first coupling disc to said spindle, and
first means for selectively operatively rotatably coupling said first stop to said first coupling disc.

20. The apparatus, as set forth in claim 19, wherein:
said first means comprises a second coupling disc coaxially, rotatably and slidably disposed on said spindle and facing said first coupling disc,
said second coupling disc has a pojection disposed about said spindle,
said first stop includes means for adjustably fastening said first stop to soid projection, and
second means for selectively operatively coupling said first and second coupling discs for joint rotation.

21. The apparatus, as set forth in claim 20, which includes:
bearings secured to said spindle adjacent said projection and permitting rotation and axial displacement of said second coupling disc for said stops connected with said second coupling disc.

22. The apparatus, as set forth in claim 20, which includes:
return springs surrounding said spindle between said first and second coupling discs and tending to move said coupling discs into an inoperative non-coupled position axially spaced apart from each other.

23. The apparatus, as set forth in claim 20, wherein:
said housing forms a cylinder,
a piston disposed in said cylinder and connected with said second coupling disc, and
a pressure conduit means terminating in said cylinder adjacent said piston for axially moving said second coupling disc into an operative coupling position with said first coupling disc for joint rotation therewith.

24. The apparatus, as set forth in claim 20, wherein:
said second coupling disc constitutes a piston disposed in said housing,
said housing forms a cylinder, and
pressure conduit means terminating in said cylinder for axially moving said second coupling disc into an operative coupling position with said first coupling disc for joint rotation therewith.

25. The apparatus, as set forth in claim 24, which includes:
a cylinder cover closing said cylinder and surrounding said projection of said second coupling disc.

26. The apparatus, as set forth in claim 25 wherein:
said cylinder cover includes an abutment portion abutting in the inoperative position said second coupling disc.

27. The apparatus, as set forth in claim 26, further comprising:
a third recoil stop mounted on said projection in the path of said second stop and spaced from said first stop,
a recoil spring disposed about and having one end connected with said projection of said second coupling disc, and
an eccentrically secured axial pin connecting the other end of said recoil spring with said cylinder cover.

28. The apparatus, as set forth in claim 27, wherein:
said second coupling disc and said recoil spring are disposed inside of said housing.

29. The apparatus, as set forth in claim 28, which includes:
contact means connected with one of said first stop and said third recoil stop rendered operative upon rotation for said predetermined angle, and
indicator means responsive to the operativeness of said contact means.

30. The apparatus, as set forth in claim 29, further comprising:
a lever pivoted to said housing in the path of said contact means and axially aligned with said second stop and disposed within the path of said one of said stops for operatively actuating said contact means.

31. The apparatus, as set forth in claim 30, further comprising:
a drive means including at least two torque loads, one for an initial turning of said spindle and the other for said turning of said spindle through said predetermined angle.

32. The apparatus, as set forth in claim 31, wherein:
said drive means has a separate motor for each of said two torque loads.

33. The apparatus, as set forth in claim 32, wherein:
said separate motors are disposed in series coaxially to said spindle.

34. The apparatus, as set forth in claim 31, wherein:
said drive means comprises at least one hydraulic motor.

35. The apparatus, as set forth in claim 31, wherein:
said drive means comprises at least one pressurized air motor.

36. The apparatus, as set forth in claim 33, wherein:
two pressurized air motors are coupled to each other and to said spindle, and
one of said motors has a lower torque for said initial turning of the threaded part and the other of said motors has a larger torque for the subsequent tightening of said threaded part through said predetermined angle, and
means for combining said two motors.

37. The apparatus, as set forth in claim 36, which includes:
shifting means for rendering said pressure conduit means operative upon said initial turning of said threaded part.

38. The apparatus, as set forth in claim 37, which includes:
a valve connected with said shifting means and disposed in said pressure conduit means leading to said cylinder, and
said valve opening upon completing said initial turning of said threaded part.

References Cited

UNITED STATES PATENTS

| | | | |
|---|---|---|---|
| 2,796,789 | 6/1957 | Rice et al. | 81—52.4 |
| 2,893,278 | 7/1959 | Rice | 81—52.4 |
| 2,951,389 | 9/1960 | Wille | 81—52.4 X |
| 2,952,176 | 9/1960 | Mitchel | 81—52.4 |
| 3,180,612 | 4/1965 | Spyridakis et al. | 173—12 X |
| 3,344,865 | 10/1967 | Kitchen et al. | 81—52.4 X |

ERNEST R. PURSER, *Primary Examiner.*

U.S. Cl. X.R.

81—52.4; 192—142